Patented June 17, 1952

2,601,221

UNITED STATES PATENT OFFICE 2,601,221

DISSOCIATION OF AMMONIA

Edgar F. Rosenblatt, Montclair, and Johan G. Cohn, East Orange, N. J., assignors to Baker & Co., Inc., Newark, N. J., a corporation of New Jersey No Drawing. Application March 29, 1949, Serial No. 84,246

15 Claims. (Cl. 252—374)

This invention deals with the dissociation of ammonia to nitrogen and hydrogen.

Ammonia constitutes one source of nitrogen for use as controlled atmosphere. Controlled atmospheres are employed, e. g., in annealing operations and other metallurgical processes. They are used in refrigeration and the preservation of food. Generally, however, the chief purpose of using a controlled atmosphere is the prevention of oxidation, e. g. of metals, which would otherwise occur, in the presence of air.

The standard method of using ammonia as a source of controlled atmosphere is the cracking of the ammonia in an ammonia dissociator, usually in the presence of a nickel catalyst, to deliver a gaseous mixture of 25% nitrogen and 75% hydrogen. This splitting of the ammonia involves an endothermic reaction and, hence, requires the continuous supply of heat. Such dissociators normally require operation at 900° C. Any change in the amount of heat supplied affects the quantity of ammonia cracked and, consequently, the amount of ammonia left unconverted.

It is one object of this invention to provide a method of producing nitrogen and hydrogen from ammonia, which shall be more efficient than that used hitherto. It is another object of this invention to provide a method of cracking ammonia which shall require the addition of less heat that heretofore. Other objects and advantages of the more economical method of cracking ammonia will appear from the description thereof hereinafter following.

Essentially, the present invention deals with a new catalyst designed for the splitting of ammonia.

Ammonia can be catalytically split to produce nitrogen either by combustion,

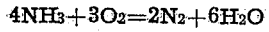

$$4NH_3 + 3O_2 = 2N_2 + 6H_2O$$

or cracking, $4NH_3 = 2N_2 + 6H_2$. We have discovered that the combustion reaction is most efficiently carried out in the presence of a supported catalyst of platinum, whereas the cracking phase of this splitting is most efficiently carried out in the presence of a supported catalyst of ruthenium, rhodium or iridium.

With a sufficient excess of ammonia over the molecular ratio 4:3 of ammonia to oxygen, i. e. over the stoichiometric amount of the formula $4NH_3 + 3O_2 = 2N_2 + 6H_2O$, the supported platinum catalyst will also assist in the cracking of the ammonia but by far not as efficiently as the supported catalyst of ruthenium, rhodium or iridium. Conversely, the latter catalyst will also assist in the combustion of the ammonia but at a far lower degree of efficiency than the supported platinum catalyst.

The support is in subdivided form, e. g. pellets, granules, etc. It consists of suitable material, but for this reaction is preferably constituted of aluminum oxide or zirconium dioxide, being dehydrated either prior to the formation of the catalyst or by heating of the catalyst, e. g. in the use of the catalyst in the process, e. g. activated alumina.

The oxidation reaction is exothermic,

$$4NH_3 + 3O_2 = 2N_2 + 6H_2O + 298,400$$

calories, whereas the cracking reaction is moderately endothermic, $4NH_3 = 2N_2 + 6H_2 - 43,600$ calories. The exothermic reaction requires heating only to start it, whereas the endothermic reaction requires continuous heating.

The cracking catalyst of supported ruthenium, rhodium or iridium, or mixtures thereof, is characterized by its high efficiency at the operating temperature, which, furthermore, is lower than that of other catalysts for such reaction.

The metal taken from the group rhodium, ruthenium and iridium is deposited on the support in a very fine, uniform layer. Generally, it constitutes from 0.1% to 2% of the whole, by weight. The preferred quantity is about 0.5%. The same proportions apply to the supported platinum catalysts.

The cracking catalyst may be employed by itself, the delivery in such case being about 25% nitrogen and 75% hydrogen. Generally, however, it is not necessary to have such high hydrogen concentrations in controlled atmospheres. Hence, to this extent, it is a feature of this invention to use such catalyst in combination with the combustion catalyst, thus making possible the utilization of the heat developed in the exothermic reaction to sustain the endothermic cracking reaction.

In such case, we pass the ammonia together with air over the combustion catalyst, taking care that there is a substantially excess of ammonia over that required to satisfy the formula $4NH_3 + 3O_2 = 2N_2 + 6H_2O$, and then pass the reacted mixture over the cracking catalyst.

For example, a mixture of 31% ammonia and 69% air was passed over a catalyst of 0.5% platinum on activated alumina in the form of pellets. In the reaction chamber was included a supported catalyst of 0.5% rhodium on dehydrated alumina in pellet form. The mixture produced contained 60.2% nitrogen and 15% hydrogen, as well as 24.8% water vapor.

The water vapor can then be removed by drying or condensing and the gas is ready for use as controlled atmosphere. In the example above given, the final mixture, after removal of the water vapor contained therein, consisted of 80% nitrogen and 20% hydrogen.

The preferred way of utilizing the heat of the exothermic reaction to satisfy the heat requirements of the endothermic reaction is to pass the ammonia-air mixture first over the platinum catalyst and then over the ruthenium, rhodium or iridium catalyst either in the same catalyst chamber or in adjacent catalyst chambers; or the combustion catalyst and the cracking catalyst are mixed in the same catalyst chamber and the ammonia-air mixture is passed thereover. In another way, the platinum on the one hand and the rhodium, ruthenium or iridium on the other hand are deposited on the same support. The catalysts are arranged in the form of a thick catalyst bed and the gas passed therethrough. The ratio of platinum catalyst to iridium, rhodium or ruthenium catalyst may be so adjusted that the platinum catalyst catalyzes at least a sufficient quantity of the ammonia to provide the heat necessary to crack substantially all of the remaining ammonia in the presence of the catalyst of metal of the group consisting of rhodium, ruthenium and iridium.

The combustion reaction is quite sensitive to flow rate. In experiments using a cylindrical tube, ⅞" inside diameter, and a 2 inch long catalyst bed of platinum catalysts, 0.5% platinum on alumina pellets, the combustion of a mixture of ammonia and air containing 22.1% ammonia produced the following values of efficiency:

| Gas Mixture Linear Speed Feet/Second | Percent Ammonia Converted |
| --- | --- |
| 0.225 | 93.50 |
| 0.450 | 96.00 |
| 0.900 | 99.00 |
| 1.350 | 99.85 |

In this experiment, a flow rate of 0.225 feet/second left, therefore, 6.5% of the ammonia unconverted, whereas a flow rate of 1.35 feet/second resulted in a remainder of only 0.15% unconverted ammonia. The simplest way of providing a catalyst bed so constituted that the most efficient flow rate is obtained is to arrange the catalyst in a frustroconical chamber, with the ammonia-air mixture entering at the narrow end and leaving at the wide end. If the volume of gas introduced is small, and therefore, the velocity low, the reaction occurs predominantly at the narrow end of the cone, but if the volume is large, and, therefore, the velocity high, the reaction occurs predominantly at the wide end.

The following experiment illustrates the efficiency of the cracking catalyst of the invention over other catalysts. In passing a mixture of 75% nitrogen and 25% ammonia, a characteristic composition after the combustion has been completed, at constant flow rate over like amounts of catalyst electrically heated to the temperature indicated, the following data were determined, with respect to .5% catalyst metal deposited on alumina pellets:

| Catalyst Metal | Temperature °C. | Percent NH₃ dissociated |
| --- | --- | --- |
| Pt | 600 | 24 |
|  | 700 | 56 |
| Ru | 450 | 48 |
|  | 500 | 68 |
| Rh | 450 | 48 |
|  | 500 | 70 |
| Ir | 500 | 20 |
|  | 600 | 94 |

In all cases, the dissociation efficiency is, therefore, higher for our catalysts. In the case of rhodium and ruthenium supported catalysts, this efficiency is already marked at lower temperatures, but in the case of the iridium supported catalyst, it becomes apparent only at somewhat higher temperatures. The rhodium catalyst is our preferred catalyst because not only is it highly efficient at the lower temperatures, but also has a longer life and is not subject to volatilization in case of accidental prevalence of oxidizing conditions.

Iridium, rhodium, ruthenium deposited, either alone or in combination with one another or other metals, on the supports of oxides of aluminum or zirconium are, therefore, highly efficient catalysts for the cracking of gaseous ammonia, as distinguished from other types of catalysts.

What we claim is:

1. The method of converting ammonia into nitrogen and hydrogen, comprising passing gaseous ammonia heated to at least 500° C. over a supported catalyst, comprising as catalyst metal at least one metal of the group consisting of rhodium, ruthenium and iridium.

2. The method according to claim 1, wherein the supported catalyst comprises a dehydrated oxide taken from the group consisting of aluminum oxide and zirconium dioxide.

3. The method of converting ammonia into nitrogen and hydrogen, comprising passing a mixture of gaseous ammonia and an oxygen containing gas over a supported catalyst to combust some of the ammonia to nitrogen, said mixture passing over said catalyst at a temperature of at least 500° C., and over a supported catalyst to crack at least some of the remaining ammonia, utilizing the heat of the combustion reaction to supply at least part of the heat required for the cracking reaction, the concentration of oxygen in said mixture being such that oxygen is present in an amount not exceeding 75% of the ammonia.

4. The method of claim 3, in which the combustion catalyst comprises platinum and the cracking catalyst comprises at least one metal of the group consisting of rhodium, ruthenium and iridium.

5. The method of claim 4, in which the supported catalysts comprise a support of dehydrated oxide taken from the group consisting of aluminum oxide and zirconium dioxide.

6. The method of converting ammonia into nitrogen and hydrogen, comprising passing a mixture of gaseous ammonia and an oxygen containing gas over a supported catalyst, said mixture passing over said catalyst at a temperature of at least 500° C., said catalyst comprising as catalyst metal platinum and at least one metal of the group consisting of rhodium, ruthenium and iridium.

7. The method according to claim 6 wherein the ratio of platinum to the metal of the group consisting of rhodium, ruthenium and iridium is so adjusted that the platinum catalyst catalyzes at least a sufficient quantity of the ammonia to provide the heat necessary to crack substantially all of the remaining ammonia in the presence of the catalyst of metal of the group consisting of rhodium, ruthenium and iridium.

8. The process of producing a mixture of nitrogen and hydrogen which comprises contacting gaseous ammonia at temperature of at least 500° C. with supported catalyst comprising as catalyst metal at least one metal of the group consisting of rhodium, ruthenium, and iridium, said catalyst metal being present in said supported catalyst in an amount of from 0.1% to 2% by weight.

9. The process according to claim 8 wherein the support for said supported catalyst is formed of oxide of the group consisting of aluminum oxide and zirconium dioxide.

10. The process of producing a controlled atmosphere comprising mixing ammonia and air so that oxygen is present in the mixture in an amount less than 75% of said ammonia, contacting said mixture with supported platinum catalyst for combustion of ammonia to nitrogen and water, said mixture contacting said catalyst at a temperature of at least 500° C., and with ammonia cracking catalyst for cracking ammonia to nitrogen and hydrogen, whereby the heat of said combustion supports said cracking.

11. The process of claim 10 wherein said platinum is present in said supported catalyst in an amount of from 0.1% to 2% by weight.

12. The process of claim 10 wherein said cracking catalyst is a supported cracking catalyst comprising as catalyst metal at least one metal of the group consisting of rhodium, ruthenium and iridium, said catalyst metal in said cracking catalyst being present in an amount of from 0.1% to 2% by weight.

13. The process of claim 10 wherein said supported platinum catalyst and said cracking catalyst are mixed together whereby combustion and cracking reactions occur concurrently.

14. The process of claim 10 wherein said mixture is contacted with said supported platinum catalyst and thereafter is contacted with said cracking catalyst.

15. The process of producing a controlled atmosphere comprising the steps of placing supported catalyst in subdivided form into a frustrum shaped container open at opposite ends, said supported catalyst being a mixture of a plurality of catalysts, one of said catalysts being platinum supported catalyst, another of said catalysts being a cracking catalyst and comprising as catalyst metal at least one metal of the group consisting of rhodium, ruthenium and iridium, the supports for said catalysts being dehydrated oxide, the catalyst metals being present on said supports in an amount of from 0.1% to 2% by weight, mixing ammonia and air so that oxygen is present in the gas mixture in an amount less than 75% of said ammonia, passing said gas mixture into the smaller opening of said container, whereby some of said ammonia is converted to nitrogen and water by said platinum catalyst, said mixture passing over said platinum catalyst at a temperature of at least 500° C., and some of said ammonia is cracked to nitrogen and hydrogen by said carcking catalyst, the heat of said conversion supporting said cracking without supplying additional heat from an outside source.

EDGAR F. ROSENBLATT.
JOHAN G. COHN.

REFERENCES CITED

The following references are of record in the file of this patent:

UNITED STATES PATENTS

| Number | Name | Date |
|---|---|---|
| 1,845,785 | Dodge | Feb. 16, 1932 |
| 1,988,781 | Burke | Jan. 22, 1935 |
| 2,013,652 | Hall | Sept. 10, 1935 |
| 2,018,760 | Hickey | Oct. 29, 1935 |
| 2,267,753 | Ruthardt | Dec. 30, 1941 |
| 2,475,155 | Rosenblatt | July 5, 1949 |